(12) United States Patent
Chan et al.

(10) Patent No.: US 7,742,115 B2
(45) Date of Patent: Jun. 22, 2010

(54) PIXEL STRUCTURE HAVING NOTCH ON CAPACITOR ELECTRODE AND CONTACT OPENING ABOVE THE NOTCH CONNECTING PIXEL ELECTRODE ABOVE PASSIVATION LAYER WITH THE CAPACITOR ELECTRODE

(75) Inventors: Te-Wei Chan, Hsinchu (TW); Ting-Jui Chang, Hsinchu (TW); Yi-Pai Huang, Hsinchu (TW); Jenn-Jia Su, Hsinchu (TW); Chia-Yu Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 489 days.

(21) Appl. No.: 11/625,344

(22) Filed: Jan. 22, 2007

(65) Prior Publication Data
US 2008/0100767 A1 May 1, 2008

(30) Foreign Application Priority Data
Nov. 1, 2006 (TW) .............................. 95140413 A

(51) Int. Cl.
G02F 1/1343 (2006.01)
(52) U.S. Cl. .......................................... 349/39; 349/38
(58) Field of Classification Search .................. 349/38, 349/39
See application file for complete search history.

(56) References Cited

U.S. PATENT DOCUMENTS 6,088,071 A * 7/2000 Yamamoto et al. ............ 349/38
2006/0158574 A1* 7/2006 Kubo et al. ................... 349/38
2006/0215097 A1* 9/2006 Wu et al. ..................... 349/139

FOREIGN PATENT DOCUMENTS

| CN | 1588614 | 3/2005 |
|----|---------|--------|
| CN | 1673842 | 9/2005 |
| TW | 569168 | 1/2004 |
| TW | I242681 | 11/2005 |

* cited by examiner

Primary Examiner—John Heyman
(74) Attorney, Agent, or Firm—Jianq Chyun IP Office

(57) ABSTRACT

A pixel structure disposed on a substrate is provided. The pixel structure includes a first and a second capacitor electrode, a dielectric layer, a passivation layer, a pixel electrode, and an active device. The first capacitor electrode is disposed on the substrate and has a first notch. The dielectric layer covers the first capacitor electrode, and the second capacitor electrode is disposed on the dielectric layer above the first capacitor electrode. The passivation layer is disposed on the dielectric layer to cover the second capacitor electrode, and the passivation layer has a contact opening above the first notch for exposing a part of the second capacitor electrode. The pixel electrode is disposed on the passivation layer and is electrically connected to the second capacitor electrode through the contact opening. The active device is electrically connected to the pixel electrode. Additionally, a method for repairing the pixel structure is also provided.

22 Claims, 8 Drawing Sheets

PIXEL STRUCTURE HAVING NOTCH ON CAPACITOR ELECTRODE AND CONTACT OPENING ABOVE THE NOTCH CONNECTING PIXEL ELECTRODE ABOVE PASSIVATION LAYER WITH THE CAPACITOR ELECTRODE

CROSS-REFERENCE TO RELATED APPLICATION

This application claims the priority benefit of Taiwan application serial no. 95140413, filed Nov. 1, 2006. All disclosure of the Taiwan application is incorporated herein by reference.

BACKGROUND OF THE INVENTION

1. Field of the Invention

The present invention relates to a pixel structure and a repairing method thereof. More particularly, the present invention relates to a pixel structure, which is easily repaired, and a repairing method thereof.

2. Description of Related Art

Thin film transistor liquid crystal display (TFT-LCD) has become the main stream in display market due to its characteristics such as high display quality, low power consumption, and no radiation. A typical TFT-LCD includes a TFT array substrate, an opposite substrate, and a liquid crystal layer between the foregoing two substrates. The TFT array substrate includes a substrate, a plurality of pixel structures arranged as an array on the substrate, scan lines, and data lines. The pixel structure includes a TFT, a pixel electrode, and a storage capacitor, wherein the TFT may be an a-Si TFT or a poly-Si TFT. Generally speaking, a scan signal transmitted by the scan line turns on the corresponding TFT, the image signal transmitted by the data line is then transmitted to the corresponding pixel electrode through the TFT so that the pixel electrode controls the liquid crystal thereon. Moreover, the pixel structure can maintain a good display quality with the assistance of the storage capacitor thereof.

FIG. 1A is a schematic diagram of a conventional pixel structure, and FIG. 1B is a cross-sectional view of the pixel structure in FIG. 1A along line A-A'. Referring to both FIG. 1A and FIG. 1B, the conventional pixel structure 100 includes a scan line 110, a data line 120, a TFT 130, a storage capacitor 140, and a pixel electrode 150. The TFT 130 is electrically connected to the pixel electrode 150. The storage capacitor 140 is composed of an upper electrode 142 and a common line 160 (bottom electrode), and the storage capacitor 140 is formed on the common line 160 (Cst on common).

During fabricating processes, when short circuit between the upper electrode 142 and the common line 160 in the storage capacitor 140 is induced by particles or defects in the dielectric layer 146 caused by other factors, leakage in the storage capacitor 140 can be caused. In other words, the leakage may prohibit the pixel structure 100 from being charged effectively while the TFT 130 is turned on and may cause abnormal charge leakage while the TFT 130 is turned off. Besides, during the fabricating processes, when short circuit between the common line 160 and the pixel electrode 150 is induced by particles, the pixel electrode 150 can not receive the control signal properly, so that display abnormality is caused. In short, if short circuit occurs between the upper electrode 142 and the common line 160 or between the common line 160 and the pixel electrode 150 during fabricating processes, the pixel structure 100 cannot be repaired effectively. Accordingly, the display quality of the LCD is deteriorated.

SUMMARY OF THE INVENTION

Accordingly, the present invention is directed to provide a pixel structure which is easily repaired.

The present invention provides a method for repairing a pixel structure in order to increase the production yield of a liquid crystal display (LCD) panel.

The present invention provides a pixel structure disposed on a substrate and electrically connected to a scan line and a data line. The pixel structure includes a first capacitor electrode, a dielectric layer, a second capacitor electrode, a passivation layer, a pixel electrode, and an active device. The first capacitor electrode is disposed on the substrate and has a first notch. The dielectric layer is disposed on the substrate and covers the first capacitor electrode. The second capacitor electrode is disposed on the dielectric layer above the first capacitor electrode. The passivation layer is disposed on the dielectric layer to cover the second capacitor electrode, wherein the passivation layer has a contact opening for exposing a part of the second capacitor electrode, and the contact opening is located above the first notch. The pixel electrode is disposed on the passivation layer and is electrically connected to the second capacitor electrode through the contact opening of the passivation layer. In addition, the active device is electrically connected to the pixel electrode.

The present invention provides a method for repairing the pixel structure described above. When short circuit occurs between the first and the second capacitor electrode or between the first capacitor electrode and the pixel electrode, the method includes separating the second capacitor electrode into two parts within the scope of the first notch, so that the second capacitor electrode is electrically insulated from the active device and the pixel electrode electrically connected to the active device through the contact opening.

The present invention further provides a pixel structure disposed on a substrate and electrically connected to a scan line and a data line. The pixel structure includes a first capacitor electrode, a dielectric layer, a second capacitor electrode, a passivation layer, a pixel electrode, and an active device. The first capacitor electrode is disposed on the substrate and has an opening. The dielectric layer is disposed on the substrate and covers the first capacitor electrode. The second capacitor electrode is disposed on the dielectric layer above the first capacitor electrode, wherein the second capacitor electrode has at least one notch partially overlapped with the opening. The passivation layer is disposed on the dielectric layer to cover the second capacitor electrode, wherein the passivation layer has a contact opening for exposing a part of the second capacitor electrode, and the contact opening is located above the opening. The pixel electrode is disposed on the passivation layer and is electrically connected to the second capacitor electrode through the contact opening of the passivation layer. In addition, the active device is electrically connected to the pixel electrode.

The present invention further provides a method for repairing the pixel structure described above. When short circuit occurs between the first and the second capacitor electrode or between the first capacitor electrode and the pixel electrode, the method includes separating the second capacitor electrode into two parts within the scope of the opening, so that the second capacitor electrode is electrically insulated from the active device and the pixel electrode electrically connected to the active device through the contact opening.

According to an embodiment of the present invention, the pixel structure has a storage capacitor composed of the first and the second capacitor electrode. When short circuit occurs between the first and the second capacitor electrode or between the first capacitor electrode and the pixel electrode during the fabricating process of the pixel structure, the defective pixel structure can abandon the storage capacitor through the repairing method provided by the present invention. Besides, even though the defective pixel structure has lost its function of holding image data, the pixel structure is still capable of being driven by the image data to maintain its display performance to certain degree.

In order to make the aforementioned and other features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
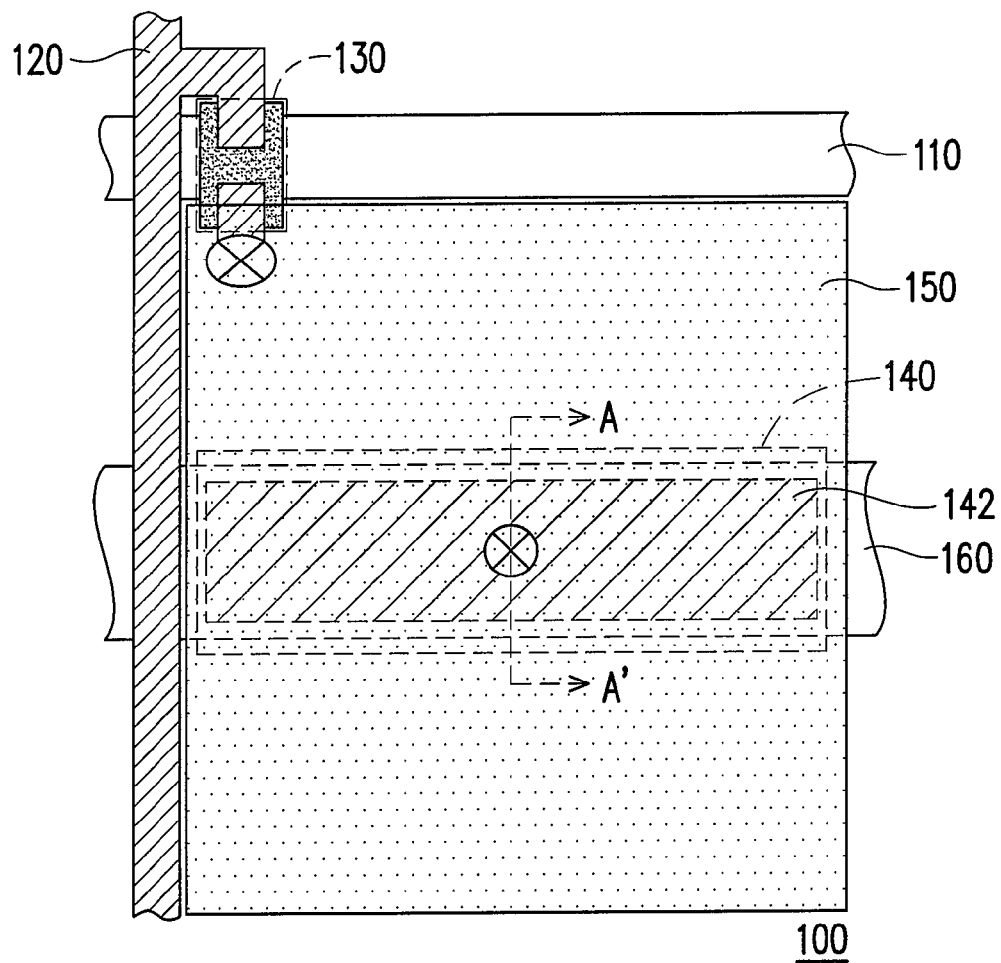
FIG. 1A is a schematic diagram of a conventional pixel structure.
Figure 1B:
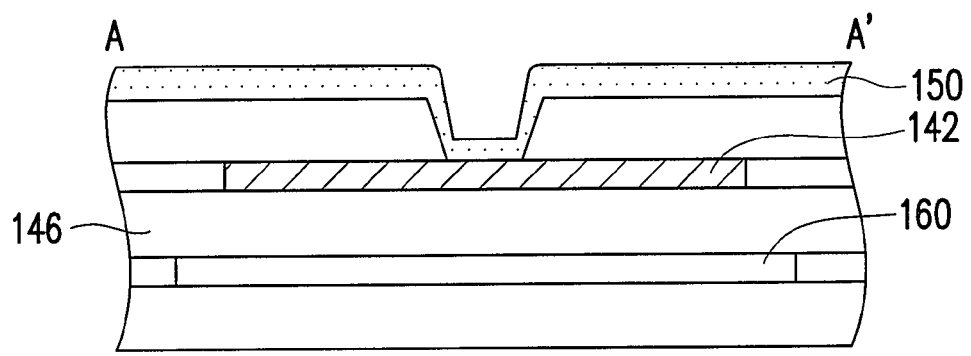
FIG. 1B is a cross-sectional view of the pixel structure in FIG. 1A along line A-A'.
Figure 2A:
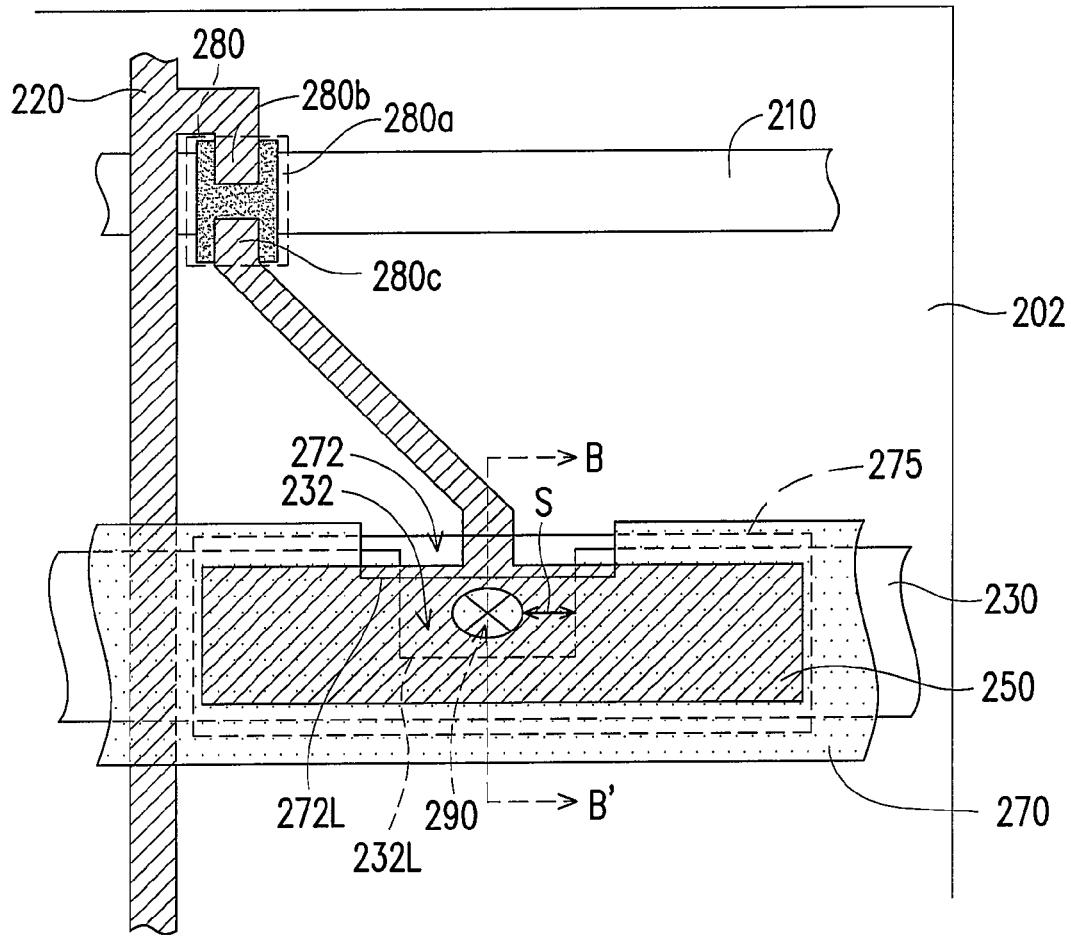
FIG. 2A is a schematic diagram of a pixel structure according to an embodiment of the present invention.
Figure 2B:
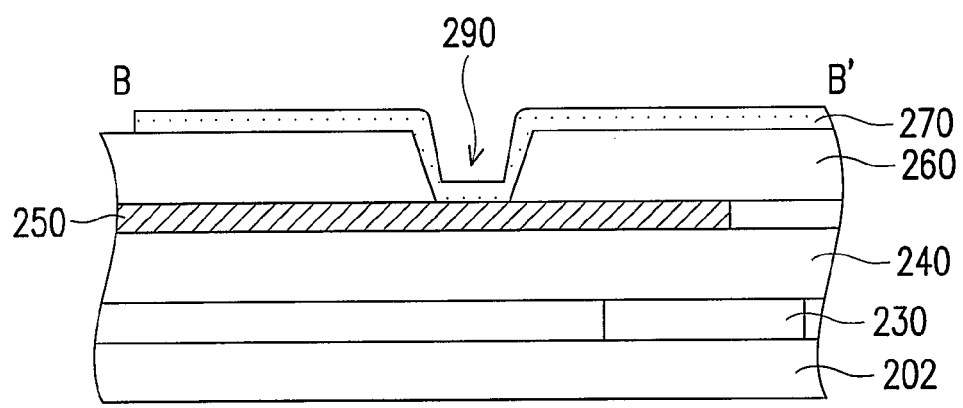
FIG. 2B is a cross-sectional view of the pixel structure in FIG. 2A along line B-B'.

FIG. 2A is a schematic diagram of a pixel structure according to an embodiment of the present invention, and FIG. 2B is a cross-sectional view of the pixel structure in FIG. 2A along line B-B'. Referring to both FIG. 2A and FIG. 2B, in the present embodiment, the pixel structure 200 is electrically connected to a scan line 210 and a data line 220. The pixel structure 200 is disposed on a substrate 202, and the pixel structure 200 includes a first capacitor electrode 230, a dielectric layer 240, a second capacitor electrode 250, a passivation layer 260, a pixel electrode 270, and an active device 280. The first capacitor electrode 230 is disposed on the substrate 202 and has a first notch 232. The dielectric layer 240 is disposed on the substrate 202 to cover the first capacitor electrode 230. The second capacitor electrode 250 is disposed on the dielectric layer 240 above the first capacitor electrode 230. The passivation layer 260 is disposed on the dielectric layer 240 to cover the second capacitor electrode 250, and the passivation layer 260 has a contact opening 290 for exposing a part of the second capacitor electrode 250. The contact opening 290 is located above the first notch 232. The pixel electrode 270 is disposed on the passivation layer 260 and is electrically connected to the second capacitor electrode 250 through the contact opening 290 of the passivation layer 260. Besides, the active device 280 is electrically connected to the pixel electrode 270.

In the present embodiment, a gap S is existed between the edge of the contact opening 290 and the edge of the first notch 232 such that subsequent repairing operation may be performed easily. To improve the repairing yield of the pixel structure 200, the gap S between the contact opening 290 and the first notch 232 is designed to allow a laser beam used for repairing passing through and radiating on the second capacitor electrode 250. In other words, the gap S between the contact opening 290 and the first notch 232 may vary with the diameter of the laser beam used for repairing.

In the present embodiment, the first notch 232 has a first alignment reference edge 232L parallel to the scan line 210. While in another embodiment of the present invention, the first alignment reference edge 232L of the first notch 232 may also have other non-linear profile which is designed to allow an alignment system (for example, an image recognition system) to precisely recognize the position of the first capacitor electrode 230. In the present embodiment, the first alignment reference edge 232L may be used for precision evaluation and feedback during a fabricating process. For example, the first alignment reference edge 232L is used for evaluating the shift between the first capacitor electrode 230 and the second capacitor electrode 250. Additionally, whether process parameters are to be adjusted is also determined according to the shift, so as to increase the production yield of the pixel structure 200.

In the present embodiment, the first notch 232 is a rectangular notch, while in another embodiment of the present invention, the first notch 232 may also be a trapezoidal notch or any other notch having the first alignment reference edge 232L, which is capable of recognizing by the alignment system (for example, an image recognition system).

In the present embodiment, the pixel electrode 270 includes at least one second notch 272, and the second notch 272 has a second alignment reference edge 272L parallel to the first alignment reference edge 232L. However, the second alignment reference edge 272L of the second notch 272 may also have other non-linear profile which is designed to allow an alignment system (for example, an image recognition system) to precisely recognize the position of the pixel electrode 270. In the present embodiment, the second alignment reference edge 272L may be used for precision evaluation and feedback during a fabricating process. For example, the second alignment reference edge 272L is used for evaluating the shift between the pixel electrode 270 and the first capacitor electrode 230 or the shift between the pixel electrode 270 and the second capacitor electrode 250. Additionally, whether process parameters are to be adjusted is also determined according to the shift, so as to increase the production yield of the pixel structure 200.

In the present embodiment, the second notch 272 is a rectangular notch, while in another embodiment of the present invention, the second notch 272 may also be a trapezoidal notch or any other notch having the second alignment reference edge 272L, which is capable of recognizing by the alignment system (for example, an image recognition system).

In the present embodiment, the active device 280 is, for example, a thin film transistor (TFT) having a gate 280a, a source 280b, and a drain 280c. As shown in FIG. 2A, the drain 280c is extended from the TFT to the second capacitor electrode 250 and is electrically connected to the second capacitor electrode 250 directly. In other words, the drain 280c and the second capacitor electrode 250 may be fabricated with the same layer of conductive material. In another embodiment of the present invention, the drain 280c may also be electrically connected to the second capacitor electrode 250 through a pixel electrode 270.

Figure 3:
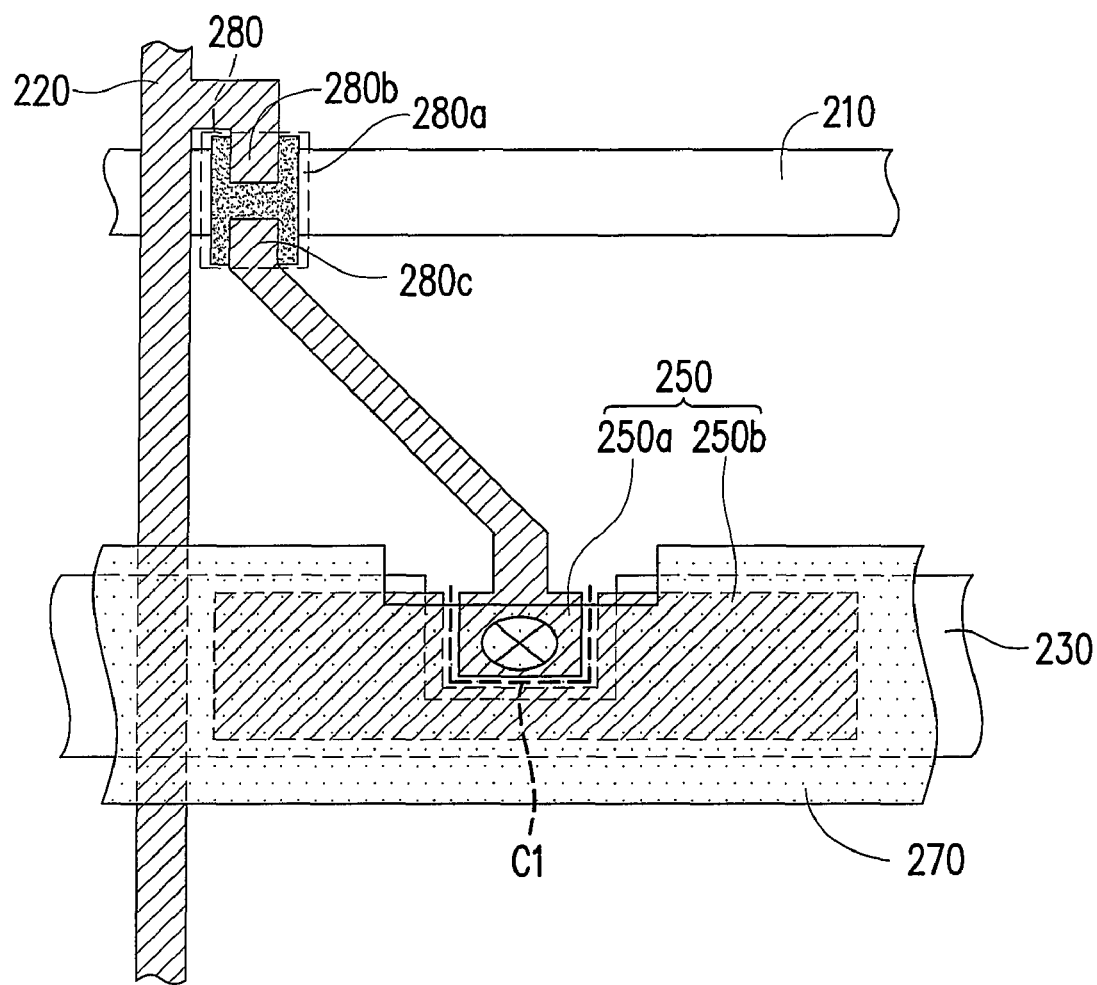
FIG. 3 illustrates the pixel structure in FIG. 2A after it is repaired.

FIG. 3 illustrates the pixel structure in FIG. 2A after it is repaired. Referring to FIG. 3, when short circuit occurs between the first capacitor electrode 230 and the second capacitor electrode 250 or between the first capacitor electrode 230 and the pixel electrode 270, the repairing method includes separating the second capacitor electrode 250 into two parts 250a and 250b within the scope of the first notch 232, so that the active device 280 and the pixel electrode 270 electrically connected to each other through the contact opening 290 are electrically insulated from the second capacitor electrode 250. As shown in FIG. 3, the foregoing repairing process is, for example, performed through laser cutting. Specifically, in the present embodiment, the second capacitor electrode 250 is cut into two parts 250a and 250b along the repairing track C1 through laser cutting. After the second capacitor electrode 250 is cut, the liquid crystal molecules above the pixel electrode 270 is still controlled by the pixel electrode 270 according to the image data transmitted by the active device 280. Thus, the repaired pixels are capable of displaying normally so that the display quality is maintained at a certain degree.

In an exemplary embodiment of the present invention, rear-side laser cutting may be used for separating the second capacitor electrode 250 into two parts 250a and 250b.

Second Embodiment

Figure 4:
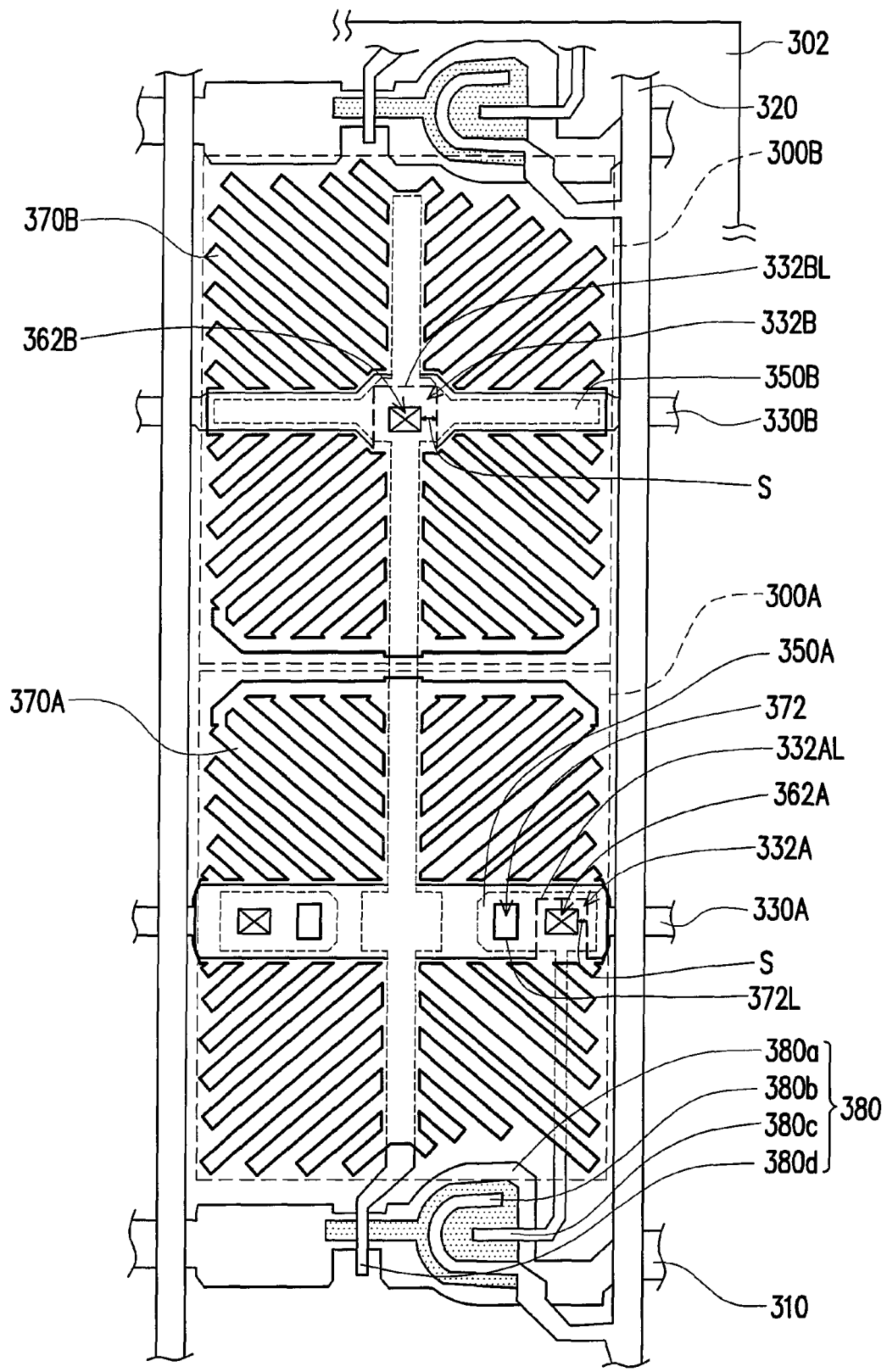
FIG. 4 is a schematic diagram of a pixel structure according to another embodiment of the present invention.

FIG. 4 is a schematic diagram of a pixel structure 300 according to another embodiment of the present invention. Referring to FIG. 4, in the present embodiment, the pixel structure 300 is electrically connected to a scan line 310 and a data line 320. In the present embodiment, the pixel structure 300 of a multi-domain vertical alignment liquid crystal display (MVA-LCD) and is driven as two parts 300A and 300B. The pixel structure 300 is disposed on a substrate 302 and the pixel structure 300 includes first capacitor electrodes 330A and 330B, a dielectric layer 340 (not shown), second capacitor electrodes 350A and 350B, a passivation layer 360 (not shown), pixel electrodes 370A and 370B, and an active device 380. The first capacitor electrodes 330A and 330B are disposed on the substrate 302 and have a first notch 332A and 332B, respectively. The dielectric layer 340 is disposed on the substrate 302 to cover the first capacitor electrodes 330A and 330B. The second capacitor electrodes 350A and 350B are disposed on the dielectric layer 340 above the first capacitor electrodes 330A and 330B, respectively. The passivation layer 360 is disposed on the dielectric layer 340 to cover the second capacitor electrodes 350A and 350B. The passivation layer 360 has a contact opening 362A and a contact opening 362B above the second capacitor electrodes 350A and 350B for exposing parts of the second capacitor electrodes 350A and 350B respectively, and the contact openings 362A and 362B are located above the first notches 332A and 332B, respectively. The pixel electrodes 370A and 370B are located on the passivation layer 360 and are electrically connected to the second capacitor electrodes 350A and 350B respectively through the contact openings 362A and 362B of the passivation layer 360. In addition, the active device 380 is electrically connected to the pixel electrodes 370A and 370B, respectively.

In the present embodiment, a gap S is generally maintained between the edge of the contact opening 362A and the edge of the first notch 332A and also between the edge of the contact opening 362B and the edge of the first notch 332B such that subsequent repairing operation may be performed easily. To improve the repairing yield of the pixel structure 300, the gap S between the contact opening 362A and the first notch 332A or between the contact opening 362B and the first notch 332B is designed to allow a laser beam used for repairing passing through and radiating on the corresponding second capacitor electrode 350A or 350B. In other words, the gap S between the contact opening 362A and the first notch 332A and between the contact opening 362B and the first notch 332B can be adjusted appropriately according to the diameter of the laser beam used for repairing.

In the present embodiment, the first notches 332A and 332B have a first alignment reference edge 332AL and a first alignment reference edge 332BL parallel to the scan line 310, respectively. While in another embodiment of the present invention, the first alignment reference edges 332AL and 332BL of the first notches 332A and 332B may also have other non-linear profile which is designed to allow an alignment system (for example, an image recognition system) to precisely recognize the position of the first capacitor electrodes 330A and 330B. In the present embodiment, the first alignment reference edges 332AL and 332BL may be used for evaluating precisely and feedback during fabricating process. For example, the first alignment reference edges 332AL and 332BL are used for precisely evaluating the shift between the first capacitor electrodes 330A, 330B and the second capacitor electrodes 350A, 350B. Additionally, whether process parameters are to be adjusted is also determined according to the shift, so as to increase the production yield of the pixel structure 300.

In the present embodiment, the first notches 332A and 332B are rectangular notches, while in another embodiment of the present invention, the first notches 332A and 332B may also be trapezoidal notches or any other notches having the first alignment reference edges 332AL and 332BL, which is capable of recognizing by the alignment system (for example, an image recognition system).

In the present embodiment, the pixel electrodes 370A includes at least one alignment opening 372 having a second alignment reference edge 372L, wherein the second alignment reference edge 372L is parallel to the first alignment reference edges 332AL. However, the second alignment reference edge 372L of the alignment opening 372 may also have other non-linear profile which is designed to allow an alignment system (for example, an image recognition system) to precisely recognize the position of the pixel electrode 370A. In the present embodiment, the second alignment reference edge 372L may be used for precisely evaluating and feedback during fabricating process. For example, the second alignment reference edge 372L is used for measuring the shift between the pixel electrode 370A and the first capacitor electrode 330A or the shift between the pixel electrode 370A and the second capacitor electrode 350A. Additionally, whether process parameters are to be adjusted is also determined according to the shift, so as to increase the production yield of the pixel structure 300.

In the present embodiment, the alignment opening 372 is rectangular alignment openings, while in another embodiment of the present invention, the alignment opening 372 may also be trapezoidal openings or any other opening having the second alignment reference edge 372L, which is capable of recognizing by the alignment system (for example, an image recognition system).

Referring to FIG. 4, in the present embodiment, the active device 380 may include two TFTs having the same source 380b. The active device 380 includes a channel, a gate 380a, a source 380b, and drains 380c and 380d. As shown in FIG. 4, the drains 380c and 380d are extended from the channel of the TFTs to the second capacitor electrodes 350A and 350B respectively and are electrically connected to the second capacitor electrodes 350A and 350B directly. In other words, the drains 380c and 380d may be fabricated with the same layer of conductive material as that of the second capacitor electrodes 350A and 350B. In another embodiment, the drains 380c and 380d may also be electrically connected to the second capacitor electrodes 350A and 350B through the pixel electrodes 370A and 370B respectively.

Figure 5:
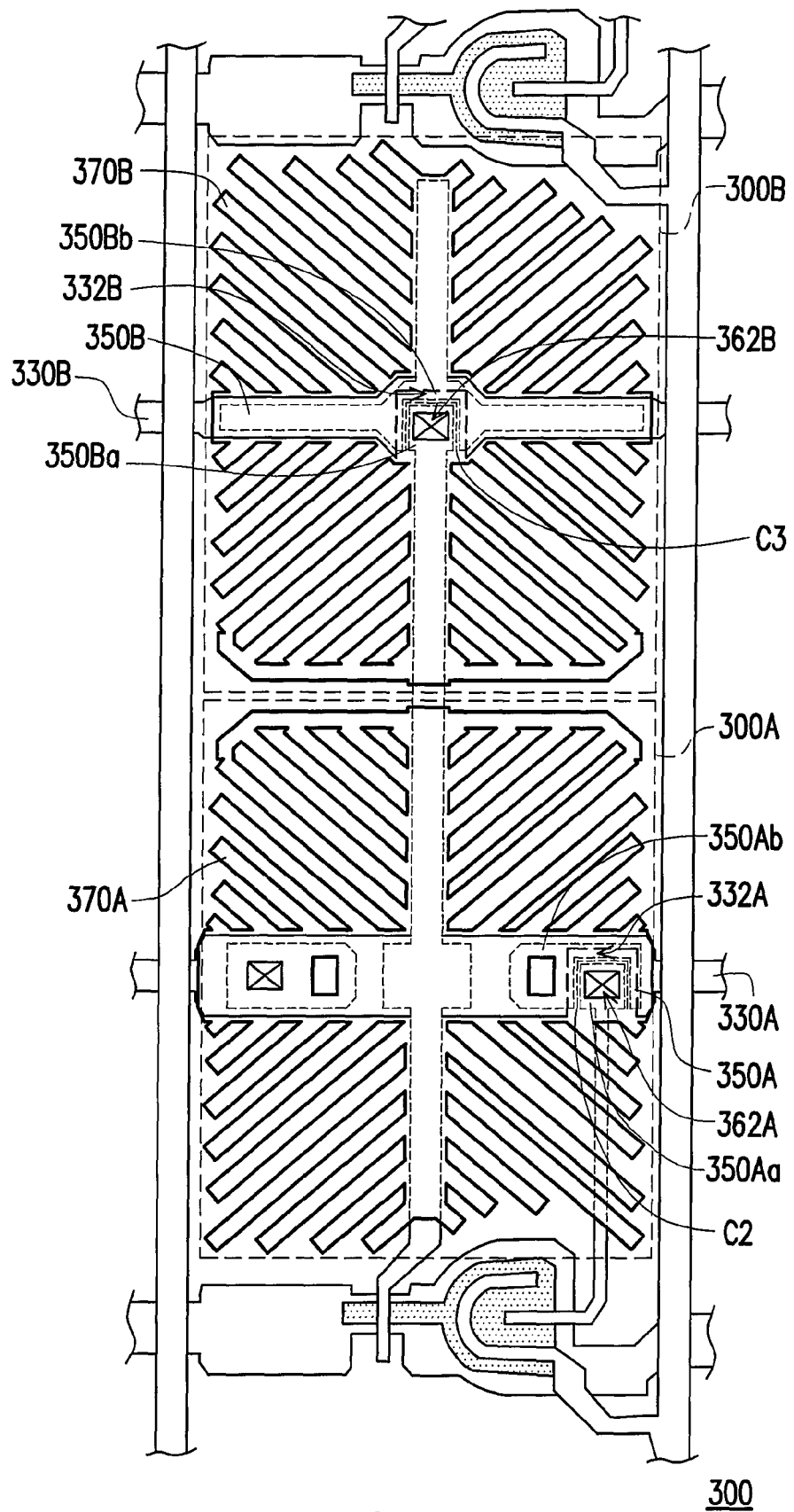
FIG. 5 illustrates the pixel structure in FIG. 4 after it is repaired.

FIG. 5 illustrates the pixel structure 300 in FIG. 4 after it is repaired. Referring to FIG. 5, when short circuit occurs between the first capacitor electrode 330A and the second capacitor electrode 350A, between the first capacitor electrode 330B and the second capacitor electrode 350B, between the first capacitor electrode 330A and the pixel electrode 370A, or between the first capacitor electrode 330B and the pixel electrode 370B, the repairing method of the pixel structure may have following situations.

Regarding to the repairing of part 300A of the pixel structure 300, the second capacitor electrode 350A is separated into two parts 350Aa and 350Ab within the scope of the first notch 332A so that the active device 380 and the pixel electrode 370A, which are electrically connected to the active device 380 through the contact opening 362A, can be electrically insulated from the second capacitor electrode 350A. Regarding to the repairing of part 300B of the pixel structure 300, the second capacitor electrode 350B is separated into two parts 350Ba and 350Bb within the scope of the first notch 332B so that the active device 380 and the pixel electrode 370B, which are electrically connected to the active device 380 through the contact opening 362B, can be electrically insulated from the second capacitor electrode 350B. As shown in FIG. 5, in the present embodiment, the foregoing repairing process may be performed through laser cutting. Specifically, regarding to the part 300A of the pixel structure 300, the second capacitor electrode 350A may be cut into two parts 350Aa and 350Ab along the repairing track C2 through laser cutting. After the second capacitor electrode 350A is cut, the liquid crystal molecules above the pixel electrode 370A is still controlled by the pixel electrode 370A according to the image data transmitted by the active device 380. Similarly, regarding to the part 300B of the pixel structure 300, the second capacitor electrode 350B may also be cut into two parts 350Ba and 350Bb along the repairing track C3 through laser cutting. After the second capacitor electrode 350B is cut, the liquid crystal molecules above the pixel electrode 370B is still controlled by the pixel electrode 370B according to the image data transmitted by the active device 380. Thus, the repaired pixels are capable of displaying normally so that the display quality is maintained at a certain degree.

In an exemplary embodiment of the present invention, rear-side laser cutting may be adopted for separating the second capacitor electrode 350A into two parts 350Aa and 350Ab or separating the second capacitor electrode 350B into two parts 350Ba and 350Bb.

Third Embodiment

Figure 6:
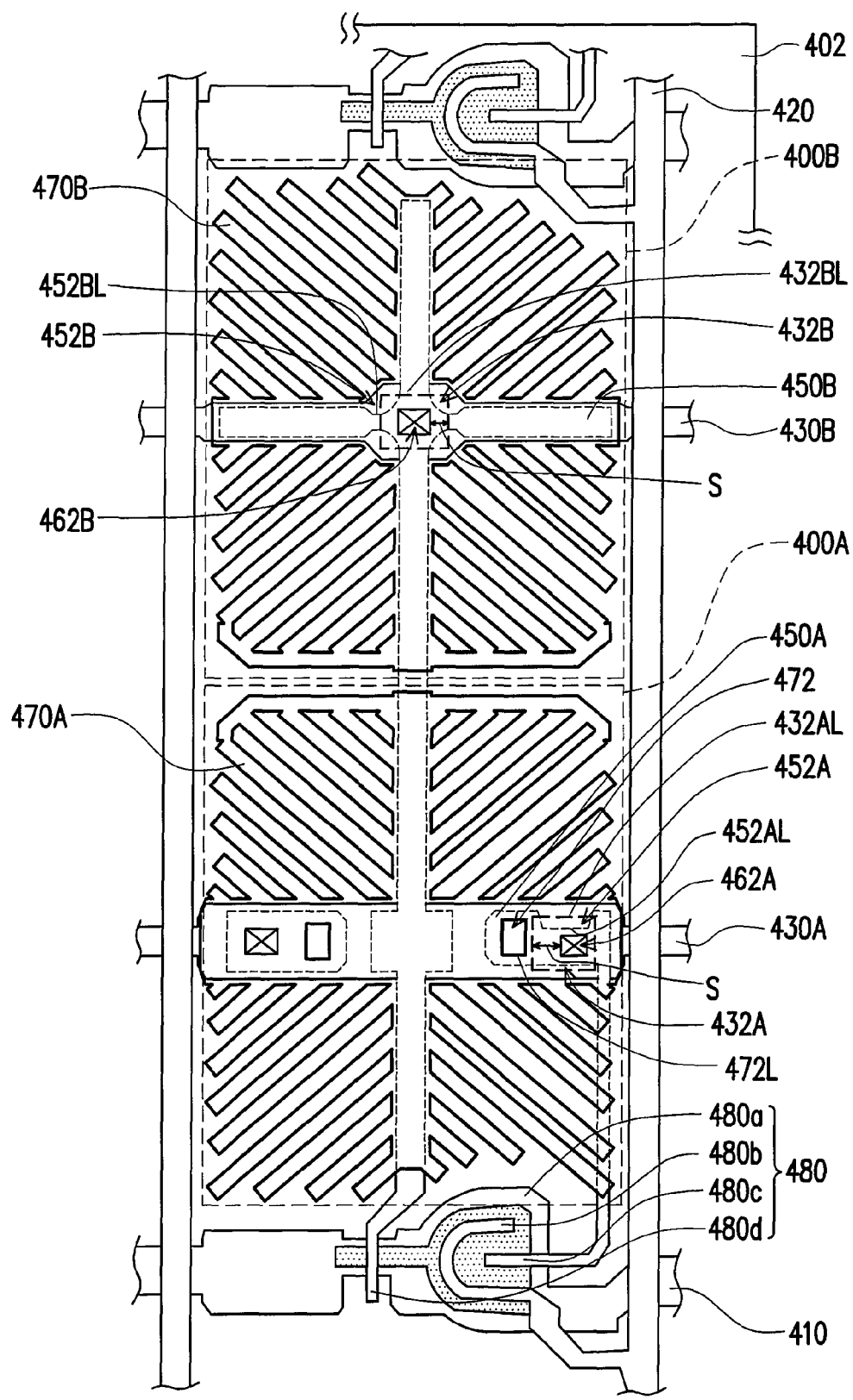
FIG. 6 is a schematic diagram of a pixel structure according to yet another embodiment of the present invention.

FIG. 6 is schematic a diagram of a pixel structure 400 according to yet another embodiment of the present invention. Referring to FIG. 6, in the present embodiment, the pixel structure 400 is electrically connected to a scan line 410 and a data line 420. In the present embodiment, the pixel structure 400 of a MVA-LCD and is driven as two parts. The pixel structure 400 is disposed on a substrate 402. The pixel structure 400 includes first capacitor electrodes 430A and 430B, a dielectric layer 440 (not shown), second capacitor electrodes 450A and 450B, a passivation layer 460 (not shown), pixel electrodes 470A and 470B, and an active device 480. The first capacitor electrodes 430A and 430B are disposed on the substrate 402 and have an opening 432A and an opening 432B, respectively. The dielectric layer 440 is disposed on the substrate 402 to cover the first capacitor electrodes 430A and 430B. The second capacitor electrodes 450A and 450B are disposed on the dielectric layer 440 above the first capacitor electrodes 430A and 430B, respectively, and the second capacitor electrodes 450A and 450B have at least one notch 452A and at least one notch 452B respectively overlapping the openings 432A and 432B partially. The passivation layer 460 is disposed on the dielectric layer 440 to cover the second capacitor electrodes 450A and 450B. The passivation layer 460 has a contact opening 462A and a contact opening 462B above the second capacitor electrodes 450A and 450B, respectively, for exposing parts of the second capacitor electrodes 450A and 450B, and the contact openings 462A and 462B are located above the openings 432A and 432B, respectively. The pixel electrodes 470A and 470B are disposed on the passivation layer 460 and are electrically connected to the second capacitor electrodes 450A and 450B through the contact openings 462A and 462B of the passivation layer 460 respectively. Besides, the active device 480 is electrically connected to the pixel electrodes 470A and 470B.

In the present embodiment, a gap S is existed between the edge of the contact opening 462A and the edge of the opening 432A, and also between the edge of the contact opening 462B and the edge of the opening 432B such that subsequent repairing operation may be performed easily. To improve the repairing yield of the pixel structure 400, the gap S between the contact opening 462A and the opening 432A and between the contact opening 462B and the opening 432B is designed to allow a laser beam used for repairing passing through easily and radiating on the corresponding second capacitor electrode 450A or 450B. In other words, the gap S between the contact opening 462A and the opening 432A, or the gap S between the contact opening 462B and the opening 432B may be adjusted appropriately according to the diameter of the laser beam used for repairing.

In the present embodiment, the openings 432A and 432B have a first alignment reference edge 432AL and a first alignment reference edge 432BL, respectively, and the first alignment reference edges 432AL and 432BL are parallel to the scan line 410. While in another embodiment of the present invention, the first alignment reference edges 432AL and 432BL of the openings 432A and 432B may also have other non-linear profile which is designed to allow an alignment system (for example, an image recognition system) to precisely recognize the position of the first capacitor electrodes 430A and 430B. In the present embodiment, the first alignment reference edges 432AL and 432BL may be used for precisely evaluating and feedback during fabricating process. For example, the first alignment reference edges 432AL and 432BL may be used for evaluating the shift between the first capacitor electrodes 430A, 430B and the second capacitor electrodes 450A, 450B. Additionally, whether process parameters are to be adjusted is also determined according to the shift, so as to increase the production yield of the pixel structure 400.

In the present embodiment, the openings 432A and 432B are rectangular openings, while in another embodiment of the present invention, the openings 432A and 432B may also be trapezoidal openings or any other openings having the first alignment reference edges 432AL and 432BL.

In the present embodiment, the pixel electrode 470A includes at least one alignment opening 472, and the alignment openings 472 has a second alignment reference edge 472L parallel to the first alignment reference edges 432AL. However, the second alignment reference edge 472L of the alignment opening 472 may also have other non-linear profile which is designed to allow an alignment system (for example, an image recognition system) to precisely recognize the position of the pixel electrode 470A. In the present embodiment, the second alignment reference edge 472L may be used for precisely evaluating and feedback during fabricating process. For example, the second alignment reference edge 472L may be used for evaluating the shift between the pixel electrode 470A and the first capacitor electrode 430A, or the shift between the pixel electrode 470A and the second capacitor electrode 450A. Additionally, whether process parameters are to be adjusted is also determined according to the shift, so as to increase the production yield of the pixel structure 400.

In the present embodiment, the alignment opening 472 is a rectangular alignment opening, while in another embodiment of the present invention, the alignment opening 472 may also be a trapezoidal opening or any other opening having the second alignment reference edge 472L.

Referring to FIG. 6, in the present embodiment, the active device 480 may include two TFTs having the same source 480b. The active device 480 includes a channel, a gate 480a, a source 480b, and drains 480c and 480d. As shown in FIG. 5, the drains 480c and 480d are extended from the channel of the TFTs to the second capacitor electrodes 450A and 450B respectively and are electrically connected to the second capacitor electrodes 450A and 450B directly. In other words, the drains 480c and 480d may be fabricated with the same layer of conductive material as that of the second capacitor electrodes 450A and 450B. In another embodiment of the present invention, the drains 480c and 480d may also be electrically connected to the second capacitor electrodes 450A and 450B through the pixel electrodes 470A and 470B respectively.

Figure 7:
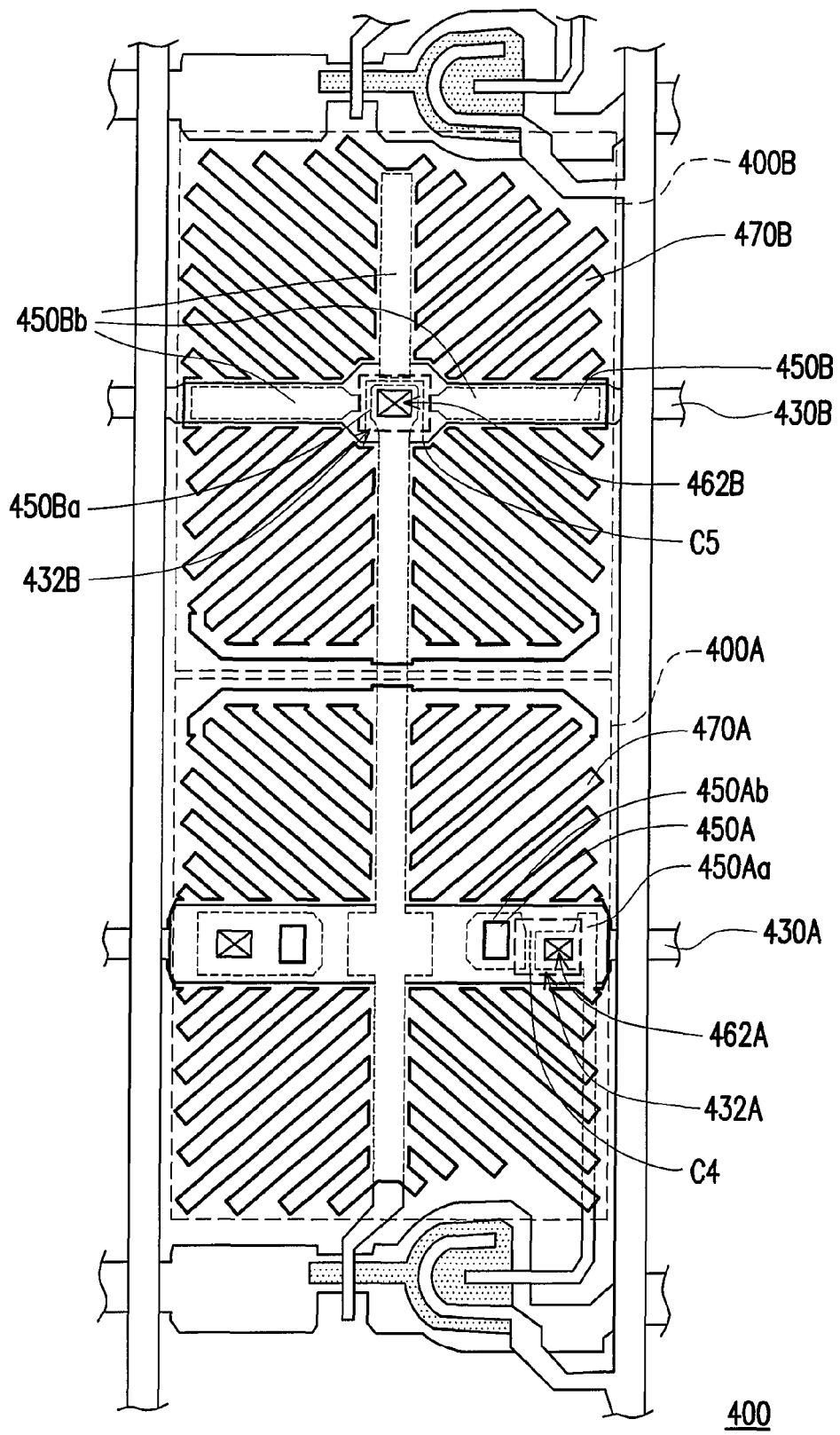
FIG. 7 illustrates the pixel structure in FIG. 6 after it is repaired.

FIG. 7 illustrates the pixel structure 400 in FIG. 6 after it is repaired. Referring to FIG. 7, when short circuit occurs between the first capacitor electrode 430A and the second capacitor electrode 450A, between the first capacitor electrode 430B and the second capacitor electrode 450B, between the first capacitor electrode 430A and the pixel electrode 470A, or between the first capacitor electrode 430B and the pixel electrode 470B, the repairing method of the pixel structure may have following situations.

Regarding to the repairing of part 400A of the pixel structure 400 in the present embodiment, the second capacitor electrode 450A is separated into two parts 450Aa and 450Ab within the scope of the opening 432A, so that the active device 480 and the pixel electrode 470A, which are electrically connected to the active device 480 through the contact opening 462A, can be electrically insulated from the second capacitor electrode 450A. Regarding to the repairing of part 400B of the pixel structure 400 in the present embodiment, the second capacitor electrode 450B is separated into two parts 450Ba and 450Bb within the scope of the opening 432A, so that the active device 480 and the pixel electrode 470B, which are electrically connected to the active device 480 through the contact opening 462B, can be electrically insulated from the second capacitor electrode 450B. As shown in FIG. 7, in the present embodiment, the foregoing repairing process may be performed through laser cutting. Specifically, Regarding to the part 400A of the pixel structure 400, the second capacitor electrode 450A may be cut into two parts 450Aa and 450Ab along the repairing track C4 through laser cutting. After the second capacitor electrode 450A is cut, the liquid crystal molecules above the pixel electrode 470A is still controlled by the pixel electrode 470A according to the image data transmitted by the active device 480. Similarly, regarding to the part 400B of the pixel structure 400, the second capacitor electrode 450B may be cut into two parts 450Ba and 450Bb along the repairing track C5 through laser cutting. After the second capacitor electrode 450B is cut, the liquid crystal molecules above the pixel electrode 470B is still controlled by the pixel electrode 470B according to the image data transmitted by the active device 480. Thus, the repaired pixels are capable of displaying normally so that the display quality is maintained at a certain degree.

In an exemplary embodiment of the present invention, rear-side laser cutting may be used for separating the second capacitor electrode 450A into two parts 450Aa and 450Ab or the second capacitor electrode 450B into two parts 450Ba and 450Bb.

Figure 8:
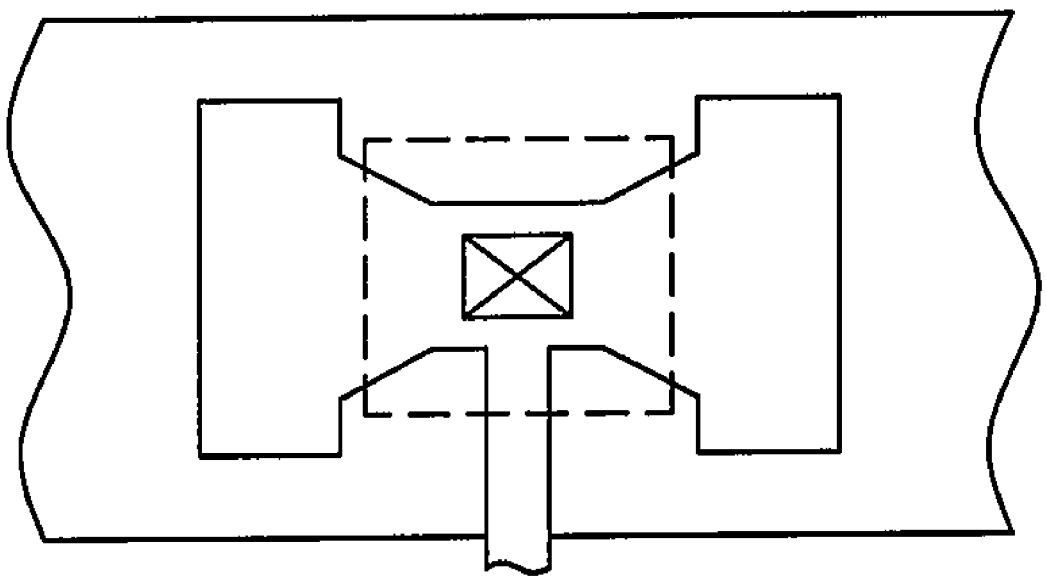
FIG. 8 is a schematic diagram of a second capacitor electrode having a plurality of notches.

In the present embodiment, the second capacitor electrode is a capacitor electrode having a notch. The second capacitor electrode may also be a capacitor electrode having a plurality of notches as shown in FIG. 8.

In summary, the present invention has at least following advantages.

1. In an embodiment of the present invention, the pixel structure is characterized in the design of the capacitor electrodes. In particular, the first capacitor electrode has a first notch or opening, which is disposed below the contact opening connecting the active device to the pixel electrode, so that the pixel structure is easy to be repaired.

2. In an embodiment of the present invention, the first alignment reference edge of the first capacitor electrode and the second alignment reference edge of the pixel electrode may be used for precisely evaluating and feedback during fabricating process, so that the production yield of the pixel structure can be increased.

3. Recognition can be done according to the shapes of the first notch, the second notch, the opening, and the alignment opening in the pixel structure while repairing the pixel structure through laser cutting, so that the positions of laser cutting can be made accurate and the repairing yield of the pixel structure can be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, disposed on a substrate and electrically connected to a scan line and a data line, comprising:
    a first capacitor electrode, disposed on the substrate and having a first notch;

a dielectric layer, disposed on the substrate and covering the first capacitor electrode;

a second capacitor electrode, disposed on the dielectric layer above the first capacitor electrode;

a passivation layer, disposed on the dielectric layer to cover the second capacitor electrode, wherein the passivation layer has a contact opening for exposing a part of the second capacitor electrode, and the contact opening is located above the first notch;

a pixel electrode, disposed on the passivation layer, the pixel electrode being electrically connected to the second capacitor electrode through the contact opening of the passivation layer; and an active device, electrically connected to the pixel electrode.

2. The pixel structure as claimed in claim 1, wherein the contact opening and an edge of the first notch form a gap therebetween.

3. The pixel structure as claimed in claim 1, wherein the first notch is a rectangular notch.

4. The pixel structure as claimed in claim 1, wherein the first notch has a first alignment reference edge, parallel to the scan line.

5. The pixel structure as claimed in claim 4, wherein the pixel electrode comprises at least one second notch, and the second notch has a second alignment reference edge parallel to the first alignment reference edge.

6. The pixel structure as claimed in claim 5, wherein the second notch is a rectangular notch.

7. The pixel structure as claimed in claim 1, wherein the active device is a thin film transistor having a gate, a source, and a drain.

8. The pixel structure as claimed in claim 7, wherein the drain is extended from the thin film transistor to the second capacitor electrode and is electrically connected to the second capacitor electrode.

9. A method for repairing the pixel structure of claim 1, wherein short circuit occurs between the first capacitor electrode and the second capacitor electrode or between the first capacitor electrode and the pixel electrode, the method comprising:

separating the second capacitor electrode into two parts within a scope of the first notch, so as to electrically insulate the second capacitor electrode from the active device and the pixel electrode electrically connected to the active device through the contact opening.

10. The method as claimed in claim 9, wherein separating the second capacitor electrode into two parts comprises laser cutting.

11. The method as claimed in claim 9, wherein separating the second capacitor electrode into two parts comprises rear-side laser cutting.

12. A pixel structure, disposed on a substrate and electrically connected to a scan line and a data line, comprising:

a first capacitor electrode, disposed on the substrate and having an opening;

a dielectric layer, disposed on the substrate and covering the first capacitor electrode;

a second capacitor electrode, disposed on the dielectric layer above the first capacitor electrode, wherein the second capacitor electrode has at least one notch partially overlapped with the opening;

a passivation layer, disposed on the dielectric layer to cover the second capacitor electrode, wherein the passivation layer has a contact opening for exposing a part of the second capacitor electrode, and the contact opening is located above the opening;

a pixel electrode, disposed on the passivation layer, the pixel electrode being electrically connected to the second capacitor electrode through the contact opening of the passivation layer; and an active device, electrically connected to the pixel electrode.

13. The pixel structure as claimed in claim 12, wherein the contact opening and an edge of the opening form a gap therebetween.

14. The pixel structure as claimed in claim 12, wherein the opening is a rectangular opening.

15. The pixel structure as claimed in claim 12, wherein the opening has a first alignment reference edge, parallel to the scan line.

16. The pixel structure as claimed in claim 15, wherein the pixel electrode comprises at least one alignment opening, and the alignment opening has a second alignment reference edge parallel to the first alignment reference edge.

17. The pixel structure as claimed in claim 16, wherein the alignment opening is a rectangular alignment opening.

18. The pixel structure as claimed in claim 12, wherein the active device is a thin film transistor having a gate, a source, and a drain.

19. The pixel structure as claimed in claim 18, wherein the drain is extended from the thin film transistor to the second capacitor electrode and is electrically connected to the second capacitor electrode.

20. A method for repairing the pixel structure of claim 12, wherein short circuit occurs between the first capacitor electrode and the second capacitor electrode or between the first capacitor electrode and the pixel electrode, the method comprising:

separating the second capacitor electrode into two parts within a scope of the opening, so as to electrically insulate the second capacitor electrode from the active device and the pixel electrode electrically connected to the active device through the contact opening.

21. The method as claimed in claim 20, wherein separating the second capacitor electrode into two parts comprises laser cutting.

22. The repairing method as claimed in claim 20, wherein separating the second capacitor electrode into two parts comprises rear-side laser cutting.

* * * * *